April 7, 1970  E. H. GRAUEL  3,504,548

PRESSURE GAUGE WITH RETARD MECHANISM

Filed April 11, 1968

INVENTOR
Ernest H. Grauel
BY
ATTORNEYS

United States Patent Office 3,504,548
Patented Apr. 7, 1970

3,504,548
PRESSURE GAUGE WITH RETARD
MECHANISM
Ernest H. Grauel, Bridgeport, Conn., assignor to American Chain & Cable Company, Inc., Bridgeport, Conn., a corporation of New York
Filed Apr. 11, 1968, Ser. No. 720,561
Int. Cl. G01l 7/04
U.S. Cl. 73—397        3 Claims

ABSTRACT OF THE DISCLOSURE

The improvement in a Bourdon pressure gauge comprising a retard member positioned in the path of flexing movement of the Bourdon tube for engagement therewith at a point intermediate its ends and in response to a predetermined pressure for decreasing the effective length of the tube.

BACKGROUND OF THE INVENTION

Field of the invention

The invention relates to Bourdon pressure gauges and more particularly to a pressure gauge in which the effective working length of the Bourdon tube is variable.

Description of the prior art

In the conventional type of Bourdon pressure gauge, a Bourdon tube is positioned in an arcuate configuration with one fixed end in communication with a source of pressure to be measured and with the other end free to move in response to flexing of the tube as caused by changes in such pressure. These gauges are provided with a pressure dial; and suitable linkage is included for connecting the free end of the Bourdon tube to a pointer which is movable along the dial for indicating the changes in pressure sensed by the Bourdon tube. With conventional Bourdon gauges, the measurable pressure range is primarily determined by the particular design of the Bourdon tube. By varying the tube design, gauges may be specifically constructed for measuring pressures ranging from 0 to 15 p.s.i. or for measuring pressures ranging from 0 to as high as 20,000 p.s.i.

Depending on the particular needs of the user, he will choose the gauge most appropriate for measuring the pressures with which he is concerned. In some situations, however, it may be desirable to be able to measure changes in pressure over a particular range, say for example 0 to 100 p.s.i. and at the same time be able to measure changes in pressure over one portion of that range with a higher degree of sensitivity than over the remaining portion of the range. As an example, sensitive readings may be required for pressures between 0 and 50 p.s.i. with less sensitive readings of pressures between 50 and 100 p.s.i. With conventional Bourdon gauges, use of a single gauge calibrated for reading pressures from 0 to 100 p.s.i. will cover the total range of pressures to be encountered but may not provide the required low pressure sensitivity. Where this is found to be the case, two gauges would be used with one specifically designed and calibrated for measuring the low pressures and the other constructed for measuring the higher pressures.

SUMMARY OF THE INVENTION

In accordance with the teachings of the present invention, a Bourdon pressure gauge is constructed for measuring changes in pressures over a predetermined range with a higher degree of sensitivity in one portion of the range than in another portion thereof. These portions of the predetermined range define separate sub-ranges; and for pressure changes occurring in one of these sub-ranges, the entire length of the Bourdon tube is free to flex while for pressure changes in the other sub-range, the movement of the Bourdon tube is retarded so that only a portion of its length flexes. With this construction, a greater amount of flexing of the Bourdon tube is required for indicating changes in the pressure of one sub-range where the entire tube is free to flex as compared to the condition where only a portion of the tube is permitted to flex. Accordingly, the pressure readings taken in response to the flexing of the entire tube will be more sensitive than where the movement of the tube is retarded. These pressure readings of the changes in pressure in the two sub-ranges are shown on the pressure dial of the gauge; and due to the extra movement of the tube when measuring pressure changes in the one sub-range where the entire tube is free to flex, the dial is calibrated with a major portion of its length representing these pressure changes. Thus, the dial will show the pressures in the one sub-range with a higher degree of accuracy than the pressures in the second sub-range.

In construction, the movement of the Bourdon tube is retarded by means of a retard member which is positioned in the path of flexing movement of the gauge so that as the pressure reaches the end of the one sub-range where sensitive readings are required, the tube will engage against the retard member and thereby lessen its effective length. Thereafter, only the portion of the tube between the point of engagement with the retard member and its free end will be permitted to flex in response to changes in pressure in the second sub-range. The retard member is adjustably positioned with respect to the tube so that its point of contact therewith may be varied to change pressures included in each sub-range and thus change the range over which sensitive readings will be taken.

In a preferred construction of the gauge of the present invention, the retard member will be set so that pressures within the sub-range of 0 to 50 p.s.i. will be measured in response to free movement of the entire Bourdon tube while pressures within the sub-range of 50 to 100 p.s.i. will be measured in response to retarded movement of the Bourdon tube. With these pressure ranges, the dial of the gauge will be calibrated so that pressures within the lower sub-range are shown over an arcuate length of about 200° while the pressures in the higher sub-range are shown over an arcuate length of about 70°. Thus, the gauge will be capable of measuring all pressures from 0 to 100 p.s.i.; however, the sensitivity of the pressure readings from 0 to 50 p.s.i. will be more accurate than would be obtainable with a conventional gauge calibrated for reading this range of pressures.

DESCRIPTION OF THE PREFERRED EMBODIMENT

Figure 1:
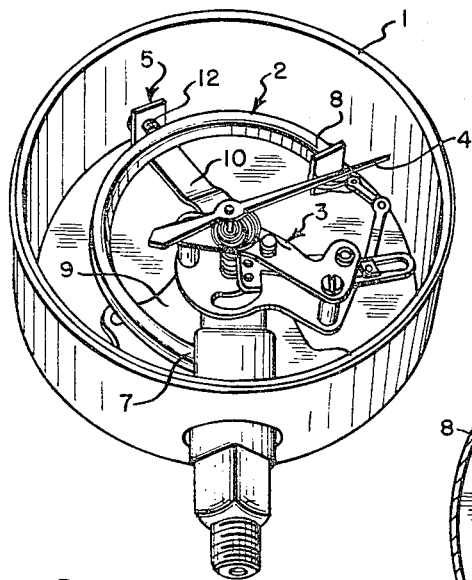
FIG. 1 is a perspective front view of the gauge with the dial face removed.

As shown in the drawings, the Bourdon pressure gauge of the present invention generally comprises a housing 1, a flexible Bourdon tube 2, linkage mechanism 3 connecting the Bourdon tube to a pointer 4, a retard means 5 for decreasing the effective length of the Bourdon tube under certain pressure conditions, and a calibrated dial 6 showing pressure values over a predetermined range. Except for the inclusion of the retard means and the calibration of the dial 6, the Bourdon pressure gauge is of conventional construction. The Bourdon tube is formed in a circular configuration and has a fixed end 7 communicating with the source of pressure to be measured and a free end 8 connected to the pointer 4 through the linkage 3. Upon changes in pressure, the radius of the Bourdon tube will be caused to change. With an increase of pressure, the radius will increase and with a decrease in pressure, the radius will decrease. Also, with this change in the configuration of the Bourdon tube, its free end 8 will be caused to move; and thus cause movement of the pointer 4 along the dial 6, the dial being calibrated in accordance with the movement of the Bourdon tube to show the pressures being sensed thereby.

Figure 3:
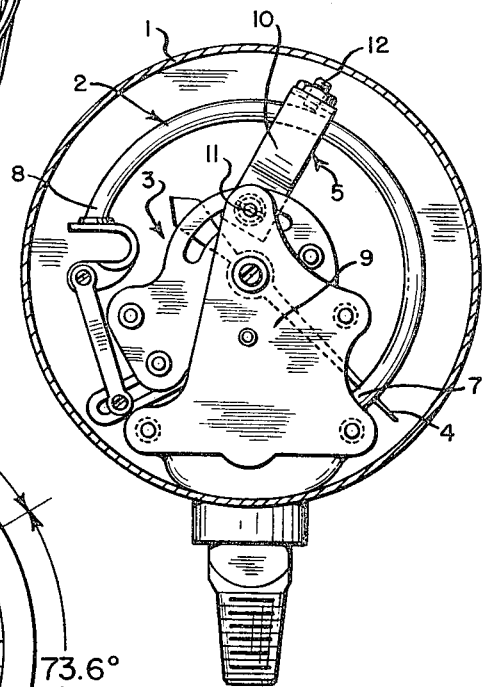
FIG. 3 is a back view of the gauge with the back cover removed.

As shown in FIG. 3, the linkage mechanism 3 of the gauge is mounted on a support bracket 9. In accordance with the teachings of the present invention, this support bracket also provides a support for the retard means 5. As also shown in FIGS. 1 and 3, the retard means includes an L-shaped bracket 10, the lower end of which is rotatably secured to the support bracket 9 at 11 and the upper end of which is disposed radially outwardly of the Bourdon tube in its path of deflection. Attached to the overlying portion of the bracket is a tube contact means 12 in the form of a set screw. The set screw is adapted to be adjusted to vary its distance from the Bourdon tube. By having the bracket 10 pivotally mounted for movement about a point 11 disposed radially inwardly of the Bourdon tube, rotation of the bracket about this point will change the location of the contact member 12 relative to the ends of the Bourdon tube. In this way, the point of engagement of the Bourdon tube with the retard means can be varied; and in any particular position of the bracket 10, the tube contact means 12 can also be adjusted radially inwardly and outwardly of the Bourdon tube to control the extent of outward flexing movement of the Bourdon tube before engagement with the contact member.

Figure 2:
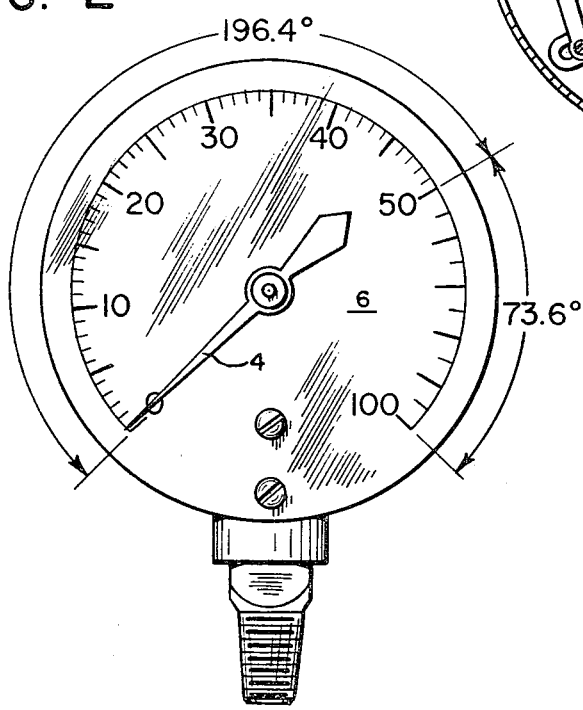
FIG. 2 is a front view of the gauge showing the calibrated dial.

With the particular setting of the retard means as shown in FIGS. 1 and 3, the Bourdon tube will be permitted to flex along its entire length upon changes in pressures from 0 to 50 p.s.i. As shown in FIG. 2, the dial of the Bourdon tube is calibrated over an arcuate length of 200° into increments representing a total of 50 p.s.i. The scale used is quite large; and accordingly, sensitive readings within this sub-range may be read from the dial. When a pressure of 50 p.s.i. is reached, the Bourdon tube will have expanded into engagement with the contact member 12. Such engagement will prevent further flexing of the tube between its fixed end and the contact member. With higher pressure readings, only the portion of the tube between the contact member and its free end will be permitted to flex. This condition is represented in FIG. 1. Due to the shorter flexing length of the Bourdon tube with pressures above 50 p.s.i., the sensitivity of the gauge is decreased; however, a wider range of pressures may be measured with less movement of the free end of the Bourdon tube and thus less movement of the pointer 4. Accordingly, only about 70° of the arcuate length of the dial is required for indicating the pressures from 50 to 100 p.s.i.

With the construction of the gauge as described above, pressure readings over the entire range of 100 p.s.i. may be made yet the sensitivity of the pressure readings from 0 to 50 p.s.i. is greater than they would be with a conventional gauge calibrated from 0 to 100 p.s.i. In addition, due to the adjustable mounting of the retard bracket 10, the range of pressures measured by flexing of the entire length of the Bourdon tube may be varied and the calibration of the dial may be changed accordingly. Alternatively, a single dial may be provided with a number of scales, each scale corresponding to a particular orientation of the retard bracket relative to the Bourdon tube.

The above description of the present invention has been made with reference to the presently preferred construction; however, it is to be understood that various changes may be made thereto without departing from the scope of the invention.

I claim:

1. In a Bourdon pressure gauge having a flexible Bourdon tube arranged in an arcuate configuration of predetermined length with one end fixed against movement to the source of pressure to be measured and with the other end free to move upon deflection of said tube in response to pressure changes within a predetermined range having first and second sub-ranges, a pressure indicator, and means connecting the free end of said tube to said pressure indicator to cause movement thereof in response to movement of the free end of said tube, the improvement comprising:

(a) retard means positioned in the path of flexing movement of said tube for engagement therewith at a point located between the ends thereof for holding the portion of the tube between said point and the one end thereof against flexing movement upon a change in pressure in said second sub-range whereby the entire tube flexes in response to changes in pressure within said first sub-range and only the portion of the tube between said point and the free end thereof flexes in response to changes in pressure within said second sub-range, said retard means including:

(1) a bracket member pivotally mounted for rotation about a point disposed radially inwardly of said tube, said bracket having an overlying portion disposed radially outwardly of said tube in the path of deflection thereof, and (2) tube contact means connected to the overlying portion of said bracket for engaging said tube upon expansive flexing thereof, said tube contact means being adjustably mounted for movement toward and away from said tube; and (b) a pressure dial along which said pressure indicator is adapted to move in response to pressure changes, said pressure dial being calibrated along a first portion thereof to indicate the values of pressure in said first sub-range and calibrated along a second portion thereof to indicate the values of pressure in said second sub-range.

2. In a Bourdon pressure gauge as set forth in claim 1 wherein:

(a) said retard means is adjustable for engagement with said tube at pressure values about midway of said predetermined range; and (b) the first portion of said pressure dial spans a distance greater than the second portion thereof.

3. In a Bourdon pressure gauge as set forth in claim 2 wherein:

(a) said first sub-range includes pressure values from 0 to about 50 p.s.i. and said second sub-range includes pressure values from about 50 to 100 p.s.i.; and (b) the first portion of said pressure dial spans an arcuate distance of about 200° and the second portion thereof spans an arcuate distance of about 70°.

References Cited

UNITED STATES PATENTS

| 1,414,127 | 4/1922 | Gabel | 73—397 |
| 2,737,811 | 3/1956 | Modes | 73—397 |

FOREIGN PATENTS

| 523,536 | 7/1940 | Great Britain. |

DONALD O. WOODIEL, Primary Examiner

U.S. Cl. X.R.

73—411

PO-1050
(5/69)

UNITED STATES PATENT OFFICE
CERTIFICATE OF CORRECTION

Patent No. 3,504,548                      Dated April 7, 1970

Inventor(s)  E. H. Grauel

It is certified that error appears in the above-identified patent and that said Letters Patent are hereby corrected as shown below:

Column 4, line 64, "1,414,127" should read --1,414,121--

SIGNED AND SEALED
AUG 25 1970

(SEAL)
Attest:

Edward M. Fletcher, Jr.
Attesting Officer

WILLIAM E. SCHUYLER, JR.
Commissioner of Patents